US 11,172,323 B1

(12) United States Patent
Seals et al.

(10) Patent No.: US 11,172,323 B1
(45) Date of Patent: Nov. 9, 2021

(54) LOCATION-BASED SOCIAL MEDIA FOR EVENTS (71) Applicant: Seals Gresham Group, LLC, Dallas, TX (US)

(72) Inventors: Robert Seals, Pearland, TX (US); Daniel Gresham, Fort Worth, TX (US)

(73) Assignee: Seals Gresham Group, LLC, Dallas, TX (US)

( * ) Notice: Subject to any disclaimer, the term of this patent is extended or adjusted under 35 U.S.C. 154(b) by 0 days.

(21) Appl. No.: 16/396,435

(22) Filed: Apr. 26, 2019

Related U.S. Application Data (60) Provisional application No. 62/663,819, filed on Apr. 27, 2018.

(51) Int. Cl.
  *H04W 4/021* (2018.01)
  *H04W 4/029* (2018.01)
  *G06F 3/0482* (2013.01)
  *H04L 12/58* (2006.01)

(52) U.S. Cl.
  CPC .......... *H04W 4/021* (2013.01); *G06F 3/0482* (2013.01); *H04L 51/32* (2013.01); *H04W 4/029* (2018.02)

(58) Field of Classification Search
  CPC ..... H04W 4/021; H04W 4/029; G06F 3/0482; H04L 51/32
  USPC ........................................................ 455/456
  See application file for complete search history.

(56) References Cited

U.S. PATENT DOCUMENTS

| | | | |
|---|---|---|---|
| 8,554,873 B1 * | 10/2013 | Ganesh | G06Q 30/0261 709/217 |
| 8,578,274 B2 | 11/2013 | Druzgalski et al. | |
| 9,049,259 B2 | 6/2015 | Rathod | |
| 9,432,418 B1 | 8/2016 | Mazniker et al. | |
| 9,602,965 B1 | 3/2017 | Kalis et al. | |
| 2011/0307399 A1 | 12/2011 | Holmes | |
| 2013/0066963 A1 | 3/2013 | Odio et al. | |
| 2014/0195276 A1 | 7/2014 | Tacchi et al. | |
| 2015/0095355 A1 * | 4/2015 | Patton | H04W 4/021 707/754 |
| 2016/0048932 A1 | 2/2016 | McNelley et al. | |
| 2016/0196577 A1 * | 7/2016 | Reese | H04W 4/023 705/14.5 |
| 2017/0126592 A1 | 5/2017 | El Ghoul | |
| 2017/0303083 A1 * | 10/2017 | Alsina | H04W 4/025 |

(Continued)

OTHER PUBLICATIONS https://developer.uber.com/docs/riders/ride-requests/tutorials/button/ introduction—Introduction to the Button, Developers/Uber, Jul. 20, 2017, 3 pages.

(Continued)

*Primary Examiner* — Charles N Appiah
*Assistant Examiner* — Frank E Donado
(74) *Attorney, Agent, or Firm* — Dunlap Codding, P.C.

(57) ABSTRACT

A computing device utilizing an open invite platform determines one or more events within a user-specified distance from the computing device or from a user-specified geographic location. The computing device determines a geo-fence about a user-selected event selected from the one or more events, identifies other open-invite users present in real time within the geo-fence, and outputs a newsfeed for the user-selected event including data from the other open-invite platform users present in real time within the geo-fence.

3 Claims, 10 Drawing Sheets
(7 of 10 Drawing Sheet(s) Filed in Color)

(56) References Cited

U.S. PATENT DOCUMENTS

| | | | |
|---|---|---|---|
| 2018/0077234 A1* | 3/2018 | Sandrew | H04W 4/021 |
| 2018/0098205 A1* | 4/2018 | Royer | H04W 4/21 |
| 2018/0115509 A1* | 4/2018 | Bosworth | H04L 51/32 |
| 2018/0216946 A1* | 8/2018 | Gueye | G06F 3/04817 |
| 2020/0076754 A1* | 3/2020 | Kim | H04N 21/2365 |
| 2020/0278894 A1* | 9/2020 | Patton | G06F 9/542 |

OTHER PUBLICATIONS https://developer.uber.com/docs/riders/ride-requests/tutoriais/deep-links/ introduction—Introduction to Deep Links, Developers/Uber, Jul. 20, 2017, 8 pages.

* cited by examiner

FIG. 10

LOCATION-BASED SOCIAL MEDIA FOR EVENTS

CROSS REFERENCE TO RELATED APPLICATION/INCORPORATION BY REFERENCE STATEMENT

This application claims priority to U.S. Provisional Application 62/663,819 filed Apr. 27, 2018, the entire contents of which are hereby expressly incorporated herein by reference.

BACKGROUND OF THE INVENTIVE CONCEPTS

1. Field of the Inventive Concepts

The present disclosure relates to methods and systems for sharing real time location-based information with a user interested in the location.

2. Brief Description of Related Art

Finding location-based information for events, businesses, functions, attractions, concerts, etc. can be both time consuming and difficult. A person may not have time to search out events and attractions and may be primarily interested in events that are well attended or attended by friends. In addition, it can be difficult for the person to find real-time information about events and attractions in which the person is interested.

What is needed is a method and system for investigating places and events of interest and accessing real-time information including people present at place/event and real time critique by those present.

SUMMARY OF THE INVENTIVE CONCEPTS

The inventive concepts disclosed and claimed herein generally relate to location based social media methods. In one embodiment, a computing device utilizing an open invite platform is used to determine one or more places or events within a user-specified distance from a user-specified geographic location. The computing device determines a geo-fence about a user-selected place or event selected from the one or more places or events. The computing device then outputs a newsfeed for the user-selected place or event, including data uploaded by the open-invite platform users present in real time within the geo-fence.

In another embodiment, a computing device utilizing an open invite platform determines the geographic location of the computing device and receives desired event characteristics input by an open-invite platform user. Based on the desired event characteristics, the computing device determines one or more events within a user-specified distance from the geographic location of the computing device. The computing device determines a geo-fence about a user-selected event selected from swipeable cards, a list, or markers on a map and outputs a video describing the user-selected event, wherein the video is provided by the host of the user-selected event. The computing device additionally outputs a newsfeed for the user-selected event, including identities of other open-invite platform users present in real time within the geo-fence. The newsfeed further includes information such as identities of open-invite platform users indicating attendance; pictures, text, and videos posted by open-invite platform users present in real time within the geo-fence; host posted content; and the like.

BRIEF DESCRIPTION OF THE DRAWINGS

The accompanying drawings, which are incorporated in and constitute a part of this specification, illustrate one or more implementations described herein and, together with the description, explain these implementations. The drawings are not intended to be drawn to scale, and certain features and certain views of the figures may be shown exaggerated, to scale or in schematic in the interest of clarity and conciseness. Not every component may be labeled in every drawing. Like reference numerals in the figures may represent and refer to the same or similar element or function.

The patent or application contains at least one drawing executed in color. Copies of this patent or patent application publication with color drawing(s) will be provided by the Office upon request and payment of the necessary fee.

In the drawings.

DETAILED DESCRIPTION OF EXEMPLARY EMBODIMENTS

Before explaining at least one embodiment of the presently disclosed inventive concept(s) in detail, it is to be understood that the presently disclosed inventive concept(s) is not limited in its application to the details and the arrangement of the components or steps or methodologies set forth in the following description or illustrated in the drawings. The presently disclosed inventive concept(s) is capable of other embodiments or of being practiced or carried out in various ways. Also, it is to be understood that the phraseology and terminology employed herein is for the purpose of description and should not be regarded as limiting.

Unless otherwise defined herein, technical terms used in connection with the presently disclosed inventive concept(s) shall have the meanings that are commonly understood by those of ordinary skill in the art. Further, unless otherwise required by context, singular terms shall include pluralities and plural terms shall include the singular.

All of the articles and/or methods disclosed herein can be made and executed without undue experimentation in light of the present disclosure. While the articles and methods of the presently disclosed inventive concept(s) have been described in terms of preferred embodiments, it will be apparent to those of skill in the art that variations may be applied to the articles and/or methods and in the steps or in the sequence of steps of the method described herein without departing from the concept, spirit, and scope of the presently disclosed inventive concept(s). All such similar substitutes and modifications apparent to those skilled in the art are deemed to be within the spirit, scope, and concept of the presently disclosed inventive concept(s).

As utilized in accordance with the present disclosure, the following terms, unless otherwise indicated, shall be understood to have the following meanings:

The use of the word "a" or "an" when used in conjunction with the term "comprising" in the claims and/or the specification may mean "one", but it is also consistent with the meaning of "one or more," "at least one," and "one or more than one." The use of the term "or" in the claims is used to mean "and/or" unless explicitly indicated to refer to alternatives only or that the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects. For example, but not by way of limitation, when the term "about" is utilized, the designated value may vary by plus or minus twelve percent, or eleven percent, or ten percent, or nine percent, or eight percent, or seven percent, or six percent, or five percent, or four percent, or three percent, or two percent, or one percent. The use of the term "at least one of X, Y, and Z" will be understood to include X alone, Y alone, and Z alone, as well as any combination of X, Y, and Z. The use of ordinal number terminology (i.e., "first," "second," "third," "fourth," etc.) is solely for the purpose of differentiating between two or more items and is not meant to imply any sequence or order or importance to one item over another or any order of addition, for example.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AAB, BBC, AAABCCCC, CBBAAA, CABABB, and so forth. The skilled artisan will understand that typically there is no limit on the number of items or terms in any combination, unless otherwise apparent from the context.

As used herein, the term "substantially" means that the subsequently described event or circumstance completely occurs or that the subsequently described event or circumstance occurs to a great extent or degree. For example, when associated with a particular event or circumstance, the term "substantially" means that the subsequently described event or circumstance occurs at least 80% of the time, or at least 85% of the time, or at least 90% of the time, or at least 95% of the time.

The term "associate" as used herein will be understood to refer to the direct or indirect connection of two or more items.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

The term "event" includes planned or social occasions as well as unplanned or common occurrences, affairs, activities, happenings, and the like.

As used herein, the term "geo-fence" means a "virtual perimeter for a real-world geographic area."

Finally, as used herein, the term "open invite" refers to a social networking service displayed on a computing device as described herein, and providing users with real-time information including attendance at a selected place or event and attendee critiques of the place or event. The term "open-invite platform" refers to a set of services, tools, and products provided by the social networking service and will be discussed in more detail hereinafter.

Figure 1:
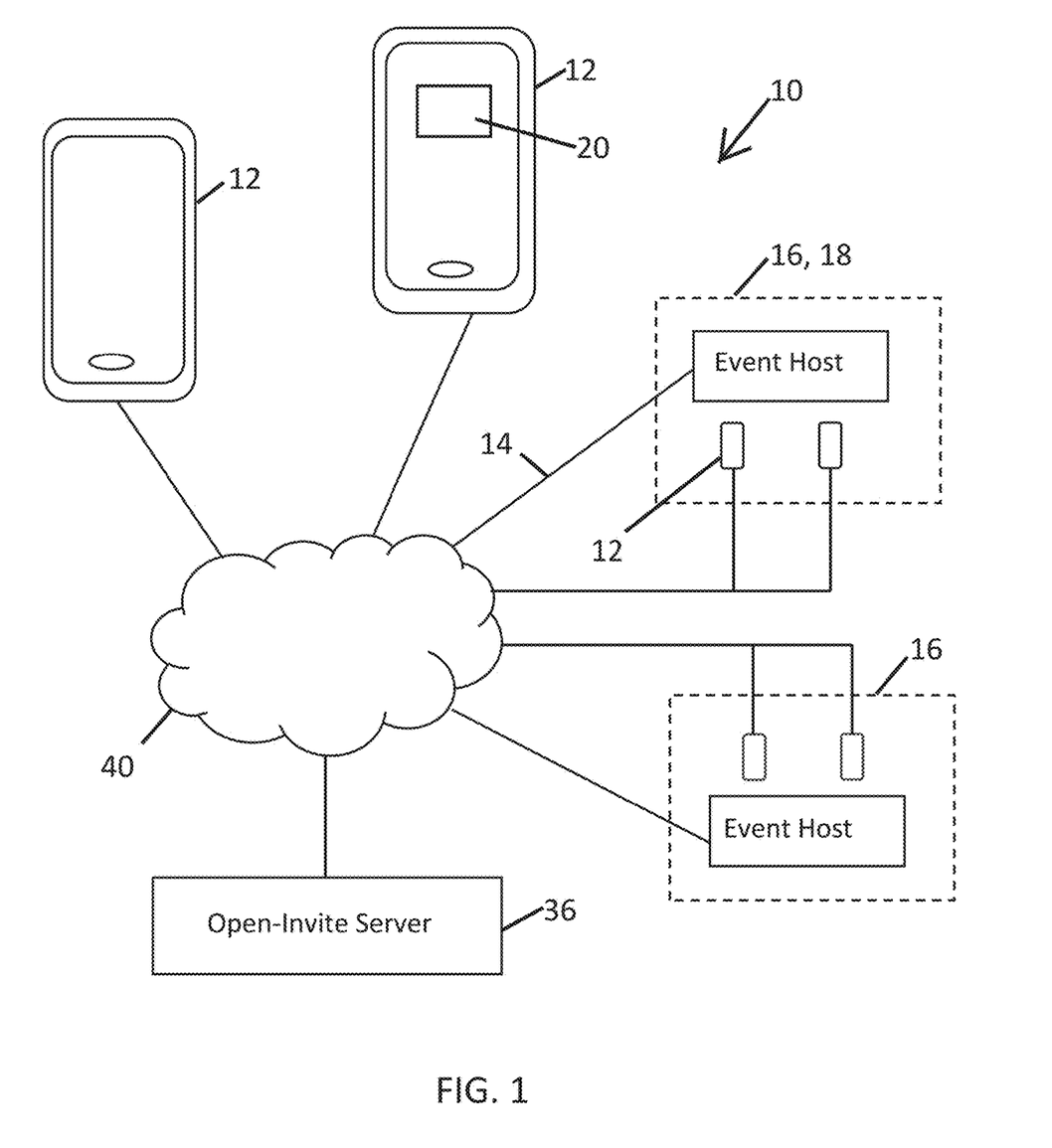
FIG. 1 is a diagram of an open-invite platform using the inventive methods in accordance with the presently disclosed inventive concept(s).

In general, methods, devices, and systems are provided to enable a computing device to display real-time visual content within a user-selected geo-fenced location. Referring now to FIG. 1, shown therein is an exemplary embodiment of an open-invite platform 10 displaying information on a computing device 12 in accordance with the inventive concepts disclosed herein. The computing device 12 determines one or more places or events 14 within a user-specified distance from the computing device or from a user-specified geographic location. The computing device 12 receives or determines a geo-fence 16 about a user-selected place or event 18 from the one or more places or events 14 and outputs (displays) a newsfeed 20 for the user-selected place or event 18, the newsfeed including data uploaded by open-invite platform users 22 present in real time within the geo-fence 16.

Figure 2:
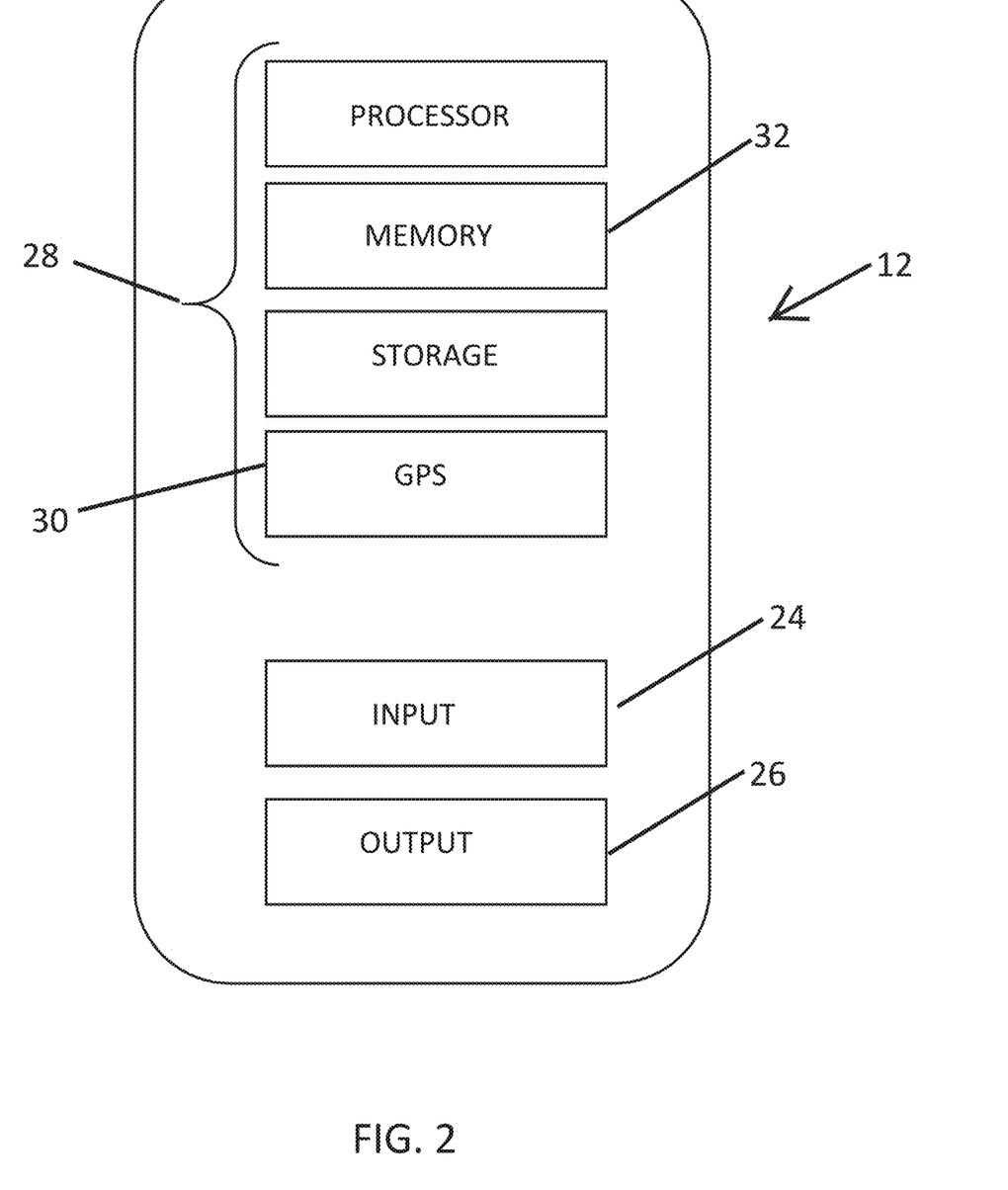
FIG. 2 illustrates an example computing device for using the inventive methods in accordance with the presently disclosed inventive concept(s).

As illustrated in FIG. 2, the computing device 12 can be implemented as a personal computer, a smart phone, network-capable TV set, TV set-top box, a tablet, a laptop computer, a desktop computer, a network-capable handheld device, and combinations thereof, for example. The computing device 12 can include an input device 24, an output device 26, and computer hardware 28 able to embody and/or execute the logic of the processes described herein. Logic embodied in the form of software instructions and/or firmware may be executed on any appropriate hardware. For example, logic embodied in the form of software instructions or firmware may be executed on a dedicated system or systems, or on a personal computer system, or on a distributed processing computer system, and/or the like. In some embodiments, logic may be implemented in a stand-alone environment operating on a single computer system and/or logic may be implemented in a networked environment, such as a distributed system using multiple computers and/or processors. The computer hardware 28 may have a processor(s) and a non-transitory computer readable medium. The term "processor" as used herein may include a single processor or multiple processors working independently and/or together to execute the logic described herein. Exemplary non-transitory computer readable medium may include random access memory, read only memory, flash memory, and combinations thereof. The term non-transitory computer readable medium, as used herein, may be implemented as a single physical device or multiple physical devices of a distributed system that may or may not be logically related.

The input device 24 is capable of receiving information input from a user and transmitting such information to the computer hardware. The input device 24 can be implemented as a keyboard, a touchscreen, a mouse, a trackball, a microphone, a fingerprint reader, an infrared port, a slide-out keyboard, a flip-out keyboard, a cell phone, a PDA, a video game controller, a remote control, a fax machine, and combinations thereof, for example.

The output device 26 outputs information in a form perceivable by a user. For example, the output device 26 can be a computer monitor, a screen, a touchscreen, a speaker, a website, a TV set, a smart phone, a PDA, a cell phone, a fax machine, a printer, a laptop computer, and combinations thereof. It is to be understood that the input device 24 and the output device 26 may be implemented as a single device, such as for example a touchscreen of a smart phone or a tablet.

Figure 3:
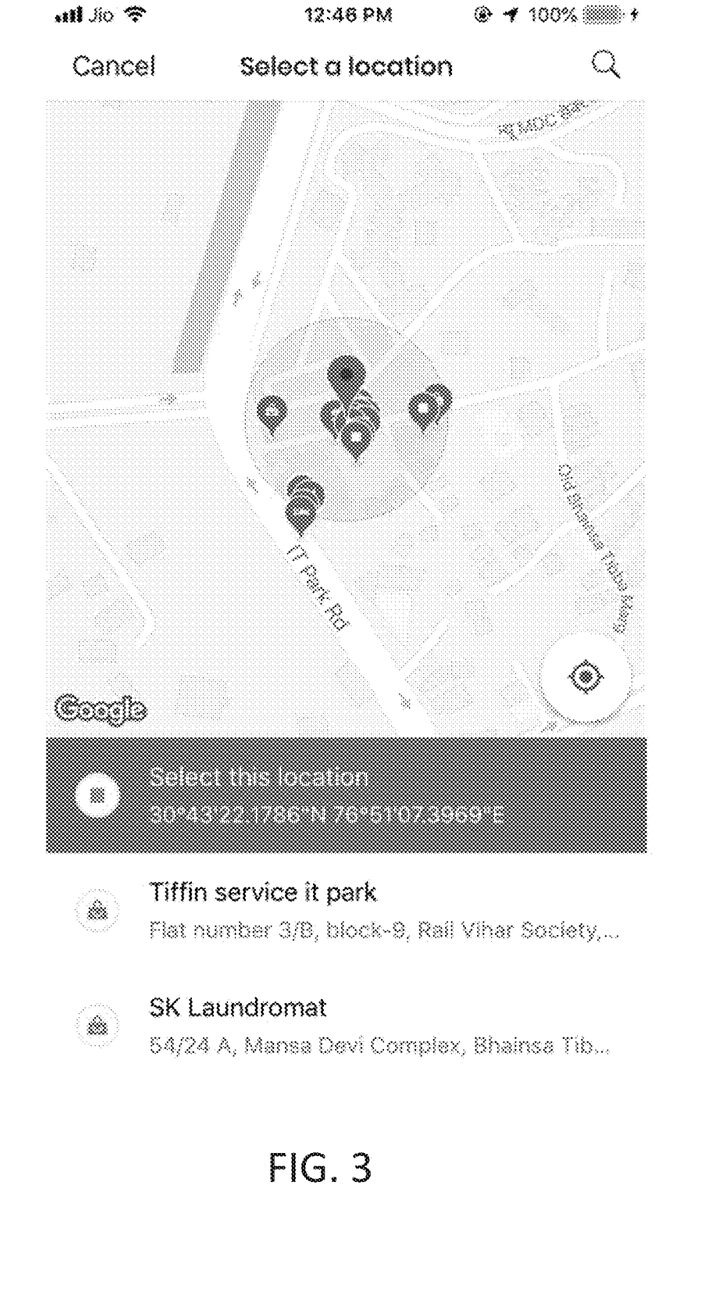
FIG. 3 illustrates an example display for an event search.
Figure 4:
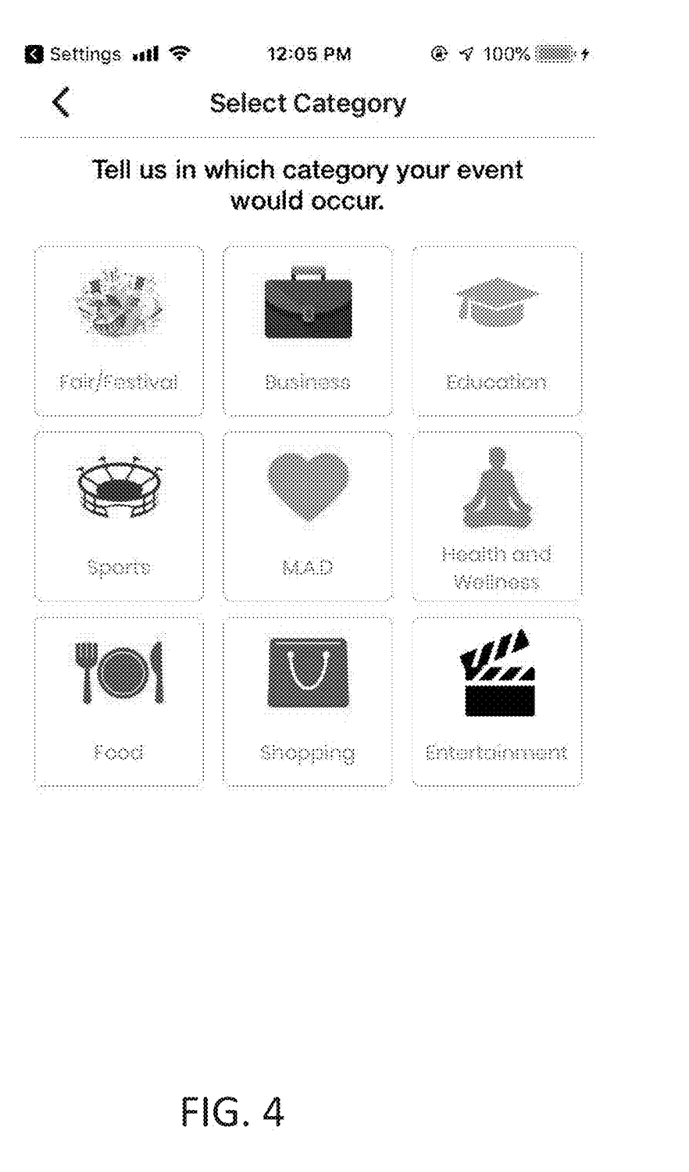
FIG. 4 illustrates an example display for inputting search filters.

The open invite platform 10 allows users to better search for places or events, restaurants, night clubs, concerts, attractions, etc. (collectively referred to hereinafter and in the appended claims as "events"). The open invite platform 10 can connect open invite platform users with event hosts and other open invite platform users. In one embodiment, the location of the computing device 12 is determined using geolocation methods known to those skilled in the art or methods yet to be devised. For example, a GPS device 30 within the computing device 12 communicates information relating to the location of the computing device 12 utilizing a satellite system. The user provides a memory 32 of the computing device 12 with data defining a desired zone 34 to search for places or events. For example, the desired zone 34 can be input as the area within a 1- or 10-mile radius of the computing device location and displayed as shown in FIG. 3. The user may also indicate the type of place or event the user is interested in. For example, the user can cause the computing device 12 to search for and identify places or events based on user choices in specific categories, user-identified filters, or a keyword search bar as illustrated in FIG. 4.

In one embodiment, the search results are determined and displayed based, at least in part, on the user's previous search. Thus, the search results can be "more of the same," or alternatively the user can request that search results include all places or events except those based on the user's previous search. In another embodiment, the user can utilize software logic identifying only those places or events differing significantly from the user's previous search selection. This can provide the user with a wide variety of activities that would otherwise not be recognized.

In one embodiment, the search results are ranked in terms of how closely the place or event characteristics searched for match the place or event characteristics associated with the event.

Figure 5:
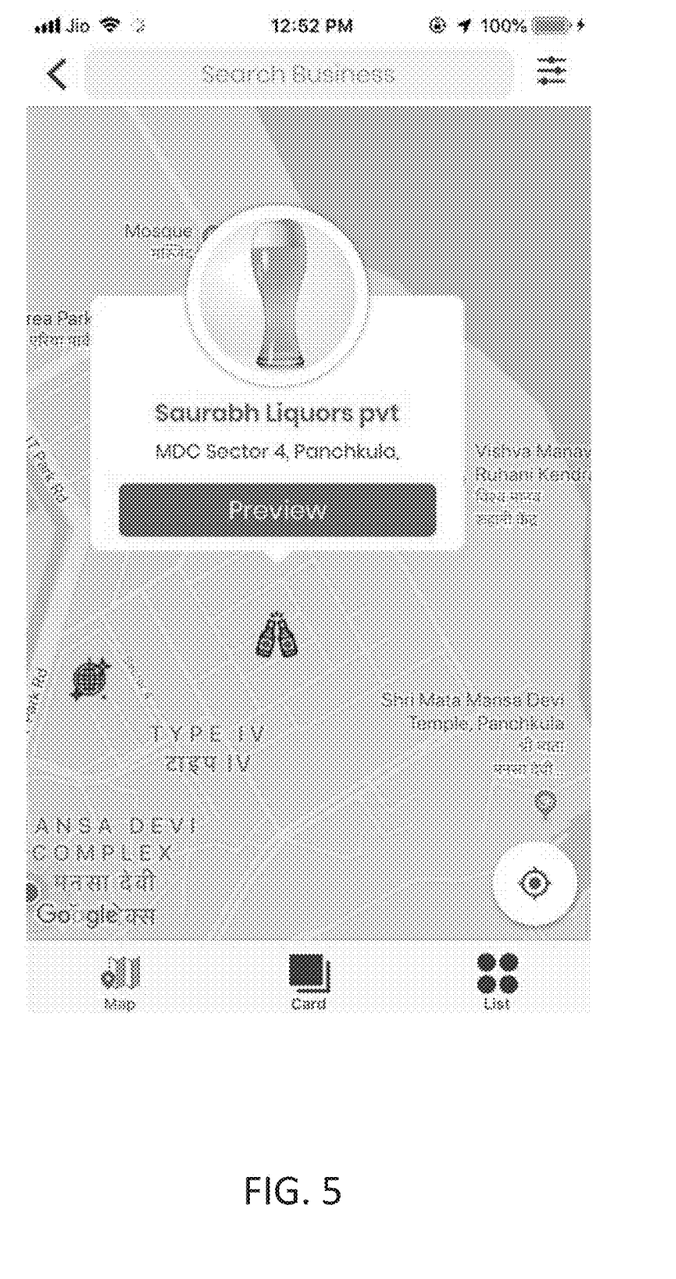
FIG. 5 illustrates a search interface embodiment including markers on a map.
Figure 6:
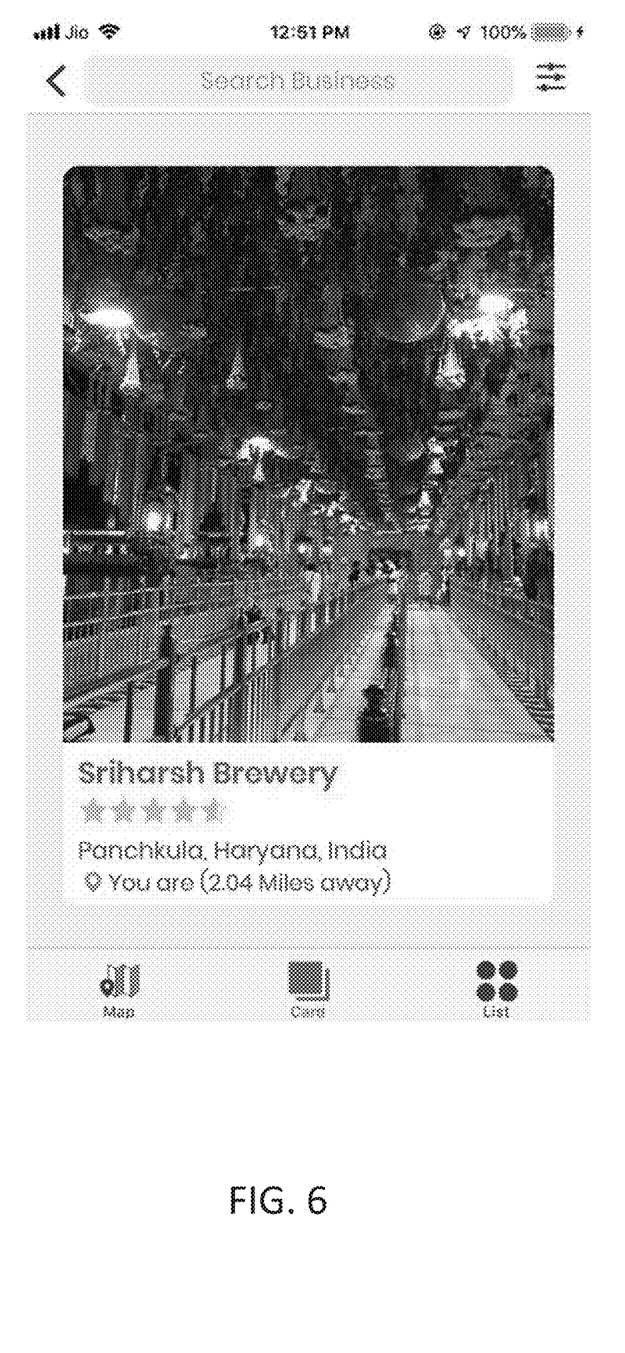
FIG. 6 illustrates a search interface embodiment including swipe-able cards.
Figure 7:
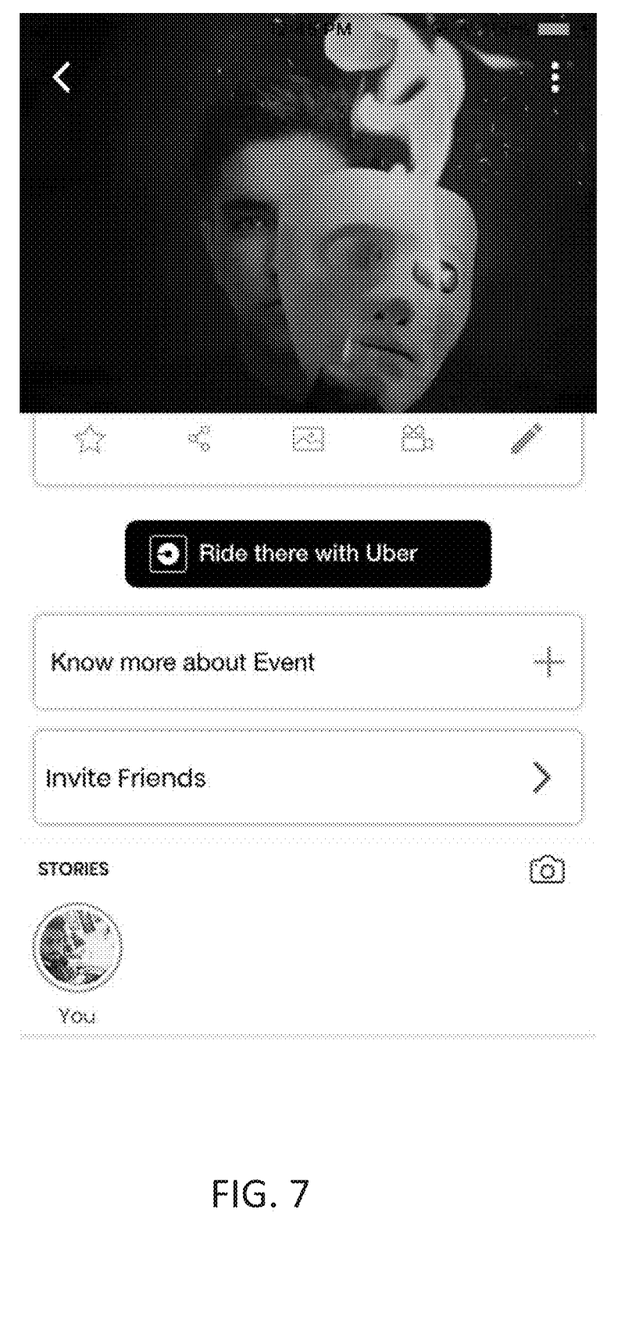
FIG. 7 illustrates an example multimedia flyer displaying information regarding a selected event.

The computing device 12 can display the search results as one or more places or events 14 using one or more search interfaces. In one embodiment, the user has an option to toggle through different search interfaces. Nonlimiting examples of suitable search interfaces include markers on a map as exemplified in FIG. 5, a list, swipe-able cards as exemplified in FIG. 7, and the like. Each interface can affect how the search results will be displayed and how the user may interact with the search results.

When a place or event 14 is selected, an open invite 15 associated with that place or event can expand to show more data-based feed (thread). For example, when search results are displayed as markers on a map, the user can select a specific marker to obtain a multimedia flyer displaying information about the selected place or event. Similarly, when search results are displayed as a list, the user can select a specific title from the list to obtain a multimedia flyer displaying information about the selected places or event. When the search results are displayed as swipe-able cards, the user can narrow the results by, for example, swiping individual cards right for "yes" and swiping left for "no." Information on the cards can also provide details of the event as multimedia flyer. In any case, the attached thread can be swiped to include additional information such as a menu, available seating, and the like.

Figure 8:
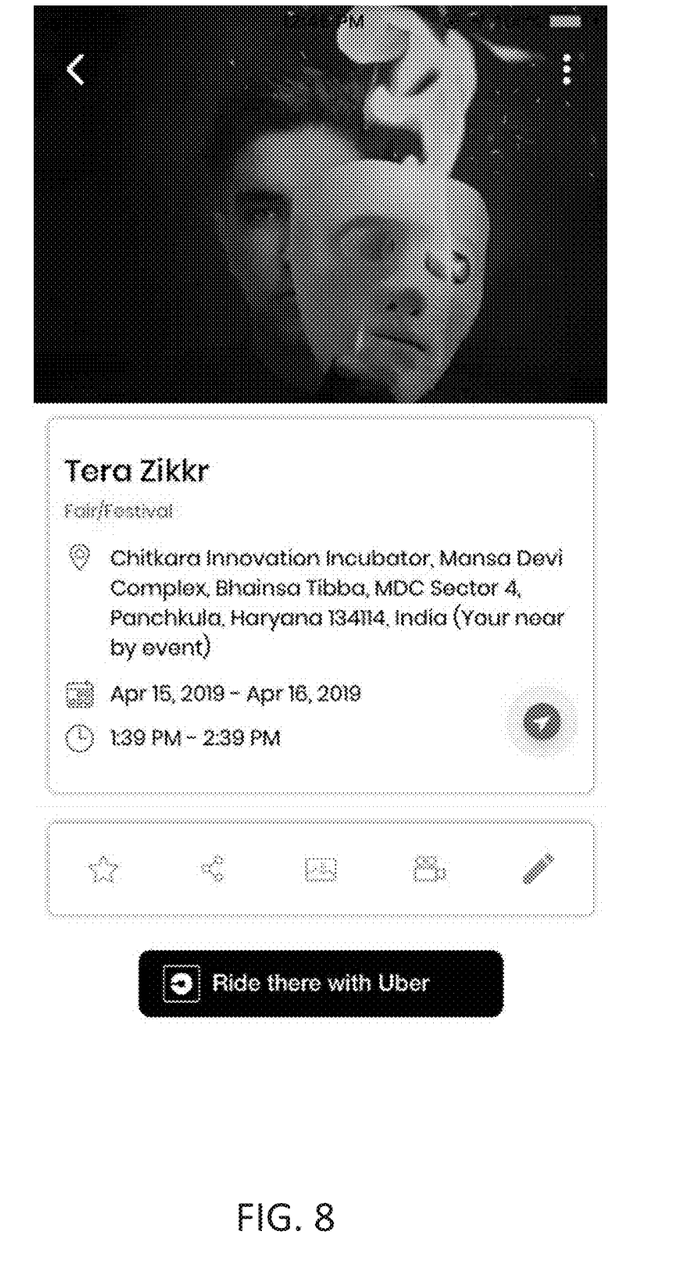
FIG. 8 illustrates an example open-invite including data such as title, address, location functionality, time, and date.
Figure 9:
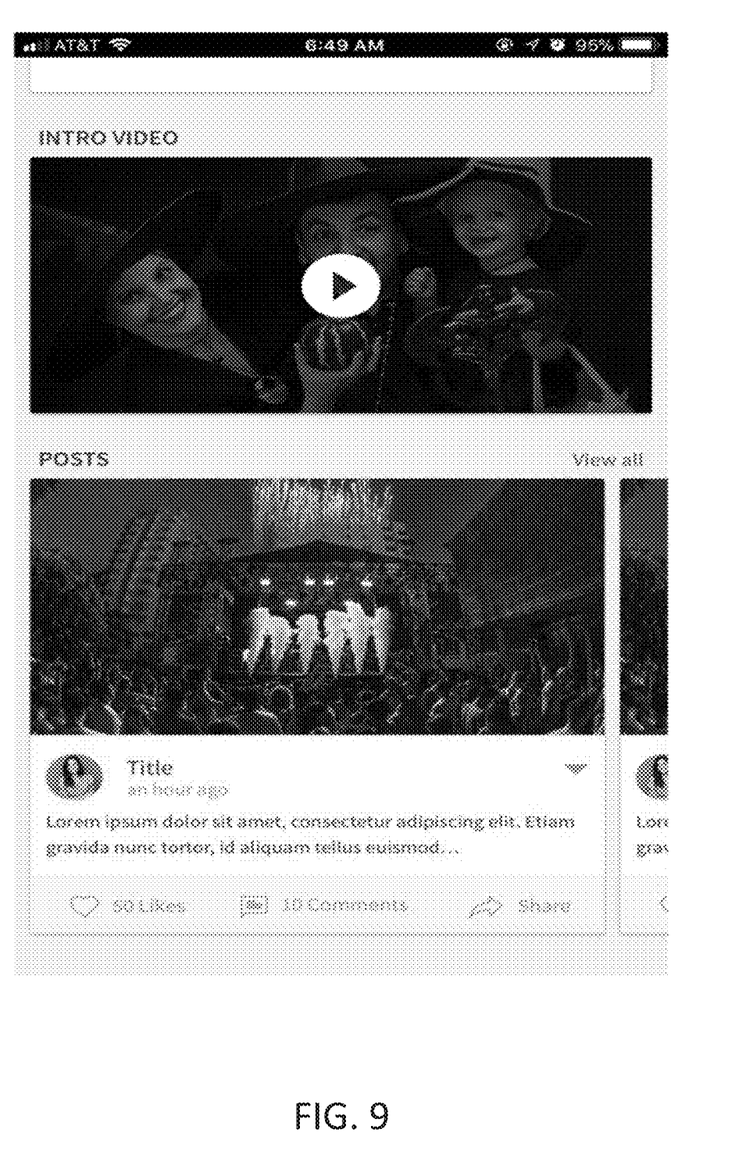
FIG. 9 illustrates another example open-invite including a location-based introductory video.

In one embodiment, and as shown in FIG. 8, the open-invite 15 can include data such as title, address, location functionality, time, and date. When a place or event 14 is selected, the open invite 15 associated with that place or event can expand to show location-based visual content such as one or more videos (for example, a short 0-30 second introductory video as illustrated in FIG. 9), a slideshow, or a news feed. The place or event host or administrator can update the visual content in real time.

In one embodiment, businesses/places can tag their videos with keyword(s) and/or information so that when users search certain keywords in a search bar for the open invite, the appropriate video will be displayed. For example, if the place of interest is a department store, the department store can add separate searchable videos displaying their different products. Thus, if the user were to search purses, a video could be shown of an employee displaying the purses they have available or explaining the deals they have available for the month, and so on.

In one embodiment, a real estate company or agent can load pre-recorded or live videos of a property showing features of interest. Nonlimiting examples of features of interest include a swimming pool slide or running fountains in a pool, a kitchen rotisserie, a home theater, electronically controlled draperies and shades, a lift system for multi-level car parking, and the like. Such features are better shown in use as a video compared to a single or series of still photographs.

Similarly, automobile dealers can display, through the open-invite 15, a slideshow as well as videos of their cars in motion. Videos can be particularly useful for showing specialty moving features of cars such as sun roofs opening, falcon-wing doors opening, lighting and safety systems in operation, and the like.

In one embodiment, when a user selects a specific place or event 18, a geo-fence 16 is automatically created around the respective location. Data for the geo-fence 16 can be supplied by the business or event host or by a third party as understood by those skilled in the art. The open invite 15 associated with that place or event can then expand to show open-invite platform users present within the geofence 16. All open-invite platform users detected within the geo-fence 16 are given the ability to post pictures, text, and videos into the location-based news feed associated with that specific place or event 18.

In one embodiment, the most popular posts, posts by friends, and host-posted content in the location-based news-feed can be pulled and displayed in the slideshow for the expanded open invite 15.

In one embodiment, an open-invite platform user not yet present within the geo-fence 16 of the selected place or event 18 can indicate he or she plans to attend by, for example, clicking an "I'm Going" tab. That open-invite platform user can then also be identified to other open-invite platform users selecting the place or event 18.

In one embodiment, the open invite 15 can include a ride share summon button. By clicking the button, the user consents to automatically forward the user's location and the selected place or event location to the ride share service. Thus, it is not necessary to enter addresses, which both saves time and decreases the likelihood of errors.

In one embodiment, open-invite information for future events can be stored to a calendar in the memory 32 of the computing device 12 or accessible to the memory 32 through an internet connection. The calendar can send notifications based on how soon the day of the event is approaching.

A computer-readable storage medium can include instructions, that when executed by a computing device such as a smart phone utilizing an open-invite platform, cause the computing device to identify one or more places or events within a user-specified distance from the computing device or from a user-specified geographic location; to determine a geo-fence about a place or event selected by the user from the one or more places or events; to determine other open-invite users present in real time within the geo-fence; and to output a newsfeed for the user-selected place or event, including data uploaded by the open-invite platform users present in real time within the geo-fence.

Figure 10:
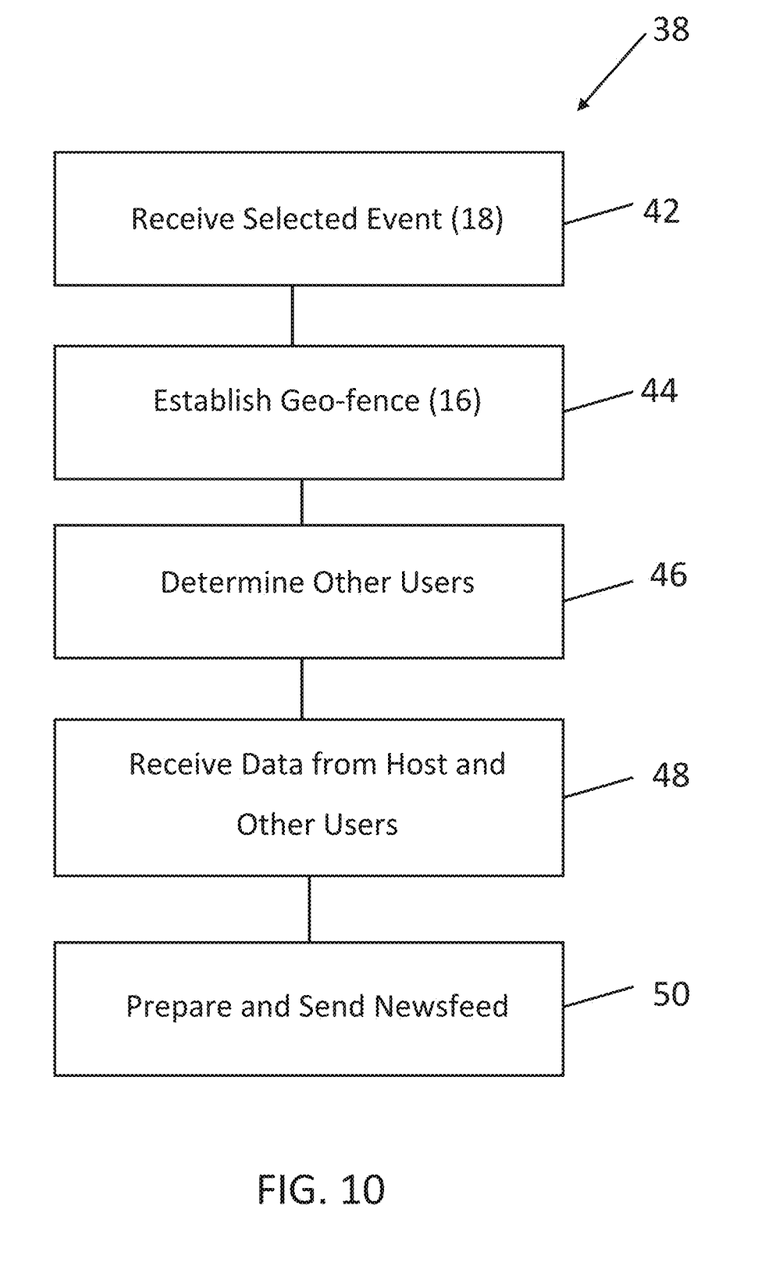
FIG. 10 is a diagram showing exemplary steps for a computing system in accordance with the presently disclosed inventive concept(s).

In one embodiment, a computing system 38 including at least one processor can be used to perform the following steps as illustrated in FIG. 10, In step 42 the computing system 38 receives a user-selected place or event. A geo-fence is identified or determined about the user-selected place or event in step 44. Other open-invite platform users present in real time within the geo-fence are determined in step 46 and uploaded data is received from at least some of these other open-invite users in step 48, in real time, and additional data can be received from the host. A newsfeed for the user-selected place or event can be determined and output in step 50, for transmission to a computing device. The newsfeed can include data uploaded by the open-invite platform users present in real time within the geo-fence. The computing system 38 can be, for example the open-invite server 36 on a network 40. In one embodiment, the network 40 is the Internet and the computing devices 12 interface with the system 38 via a communication component and a series of web pages. It should be noted, however, that the network 40 may be almost any type of network and may be implemented as the World Wide Web (or Internet), a local area network (LAN), a wide area network (WAN), a metropolitan network, a wireless network, a cellular network, a Global System for Mobile Communications (GSM) network, a code division multiple access (CDMA) network, a 3G network, a 4G network, a satellite network, a radio network, an optical network, a cable network, a public switched telephone network, an Ethernet network, combinations thereof, and/or the like. It is conceivable that in the near future, embodiments of the present disclosure may use more advanced networking topologies.

Thus, in accordance with the presently disclosed inventive concept(s), there have been provided methods of using a computing device utilizing an open-invite platform that fully satisfy the advantages set forth herein above. Although the presently disclosed inventive concept(s) has been described in conjunction with the specific language set forth herein above, it is evident that many alternatives, modifications, and variations will be apparent to those skilled in the art. Accordingly, it is intended to embrace all such alternatives, modifications, and variations that fall within the spirit and broad scope of the presently disclosed inventive concept(s). Changes may be made in the construction and the operation of the various components, elements, and assemblies described herein, as well as in the steps or the sequence of steps of the methods described herein, without departing from the spirit and scope of the presently disclosed inventive concept(s).

What is claimed is:

1. A method comprising:
   determining, by a computing device utilizing an open invite platform, a geographic location of the computing device;
   receiving, by the computing device, desired event characteristics input by an open-invite platform user;
   determining, by the computing device and based on the desired event characteristics, one or more events within a user-specified distance from the geographic location of the computing device;
   determining, by the computing device and based on a strength of a relationship between the desired event characteristics and respective event information associated with each event from the one or more events, a ranking of the one or more events;
   determining, by the computing device, a geo-fence about a user-selected event from the one or more events;
   outputting, by the computing device, a video describing the user-selected event, wherein the video is provided by a host of the user-selected event; and
   outputting, by the computing device, a newsfeed for the user-selected event, the newsfeed including identities of other open-invite platform users present in real time within the geo-fence, wherein the newsfeed further includes information selected from: identities of open-invite platform users indicating attendance; pictures, text, and videos posted by open-invite platform users present in real time within the geo-fence; host posted content; and combinations thereof, the outputting further including, based on the ranking, initial event information in a form selected from a combination of swipeable cards, a list, and markers on a map, the outputting of the newsfeed and the initial event information for consideration by a user not yet present within the geofence, wherein based on the consideration of the newsfeed and the ranked initial event information, the user not yet present within the geo-fence of the selected event indicates he or she plans to attend the event to other open-invite platform users by selection on the computing device.

2. The method of claim 1, further comprising the step of determining in real time, by the computing device, open-invite platform users present within the geofence.

3. The method of claim 1, wherein the one or more events exclude events based on a user's previous search.

* * * * *